United States Patent [19]

Hubert

[11] Patent Number: 5,058,834
[45] Date of Patent: Oct. 22, 1991

[54] LIQUID BALANCE CONTROL FOR SPINNING SPACECRAFT

[75] Inventor: Carl H. Hubert, Cranbury Township, Middlesex County, N.J.

[73] Assignee: General Electric Company, East Windsor, N.J.

[21] Appl. No.: 448,461

[22] Filed: Dec. 11, 1989

[51] Int. Cl.⁵ .............................................. B64G 1/24
[52] U.S. Cl. .................................. 244/164; 244/165; 244/135 C; 244/93
[58] Field of Search .................. 244/158 R, 165, 170, 244/172, 135 R, 135 C, 93, 164

[56] References Cited

U.S. PATENT DOCUMENTS

| | | |
|---|---|---|
| 2,853,259 | 9/1958 | Underwood, Jr. . |
| 2,860,652 | 11/1958 | Badger . |
| 2,860,654 | 11/1958 | Morley . |
| 2,969,803 | 1/1961 | Mosher . |
| 3,021,855 | 2/1962 | Cartwright et al. . |
| 3,097,480 | 7/1963 | Sohn .............................. 244/172 |
| 3,114,344 | 12/1963 | Meade . |
| 3,323,534 | 6/1967 | Johnson et al. . |
| 3,442,468 | 5/1969 | Iorillo . |
| 3,516,623 | 6/1970 | Sinden .......................... 244/169 |
| 3,996,804 | 12/1976 | Neufeld ........................ 244/164 |
| 4,002,086 | 1/1977 | Reinhall . |
| 4,366,766 | 1/1983 | Bergman . |
| 4,423,695 | 1/1984 | Rougerie . |
| 4,432,253 | 2/1984 | Kerlin . |
| 4,504,033 | 3/1985 | Engelking . |
| 4,722,183 | 2/1988 | Rosen ............................ 244/172 |
| 4,735,382 | 4/1988 | Pinson .......................... 244/165 |
| 4,776,541 | 10/1988 | Maynard . |
| 4,880,185 | 11/1989 | Apfel ............................. 244/172 |
| 4,918,619 | 4/1990 | Orloff et al. .................. 244/134 C |

OTHER PUBLICATIONS

Lorell et al., "An Automatic Mass-Trim Sys. for Spinning Spacecraft".
"The Stabilization System" by Goel et al., published at pp. 135–143 of the Proceedings of the Indian Academy of Science, vol. C1, No. 2, Sep. 1978.

Primary Examiner—Galen Barefoot
Attorney, Agent, or Firm—William H. Meise

[57] ABSTRACT

The balance of a spin-balanced spacecraft may be dynamically adjusted by moving a liquid between or among containers spaced about the spin axis. The transfer of liquid is accomplished by controllable heaters associated with each container, for heating that container from which liquid is to be transferred to increase the pressure and drive out liquid. A spacecraft for accomplishing this method includes a balance sensing arrangements such as a gyroscope and logic for determining which container or containers are to be emptied and for controlling the heaters. Weight is minimized by accomplishing the transfer of liquid among fuel containers by way of manifolds which also supply fuel to thrusters.

12 Claims, 3 Drawing Sheets

LIQUID BALANCE CONTROL FOR SPINNING SPACECRAFT

This invention relates to arrangements for balancing operating spin-stabilized spacecraft, and more particularly to arrangements for balancing such spacecraft by transferring liquid between two or more fluid containers or tanks.

The instruments carried by satellites or space vehicles tend to be directional in nature, so that the characteristics of particular portions of the environment may be examined or contacted. Such instruments include television cameras, telescopes, laser or radar altimeters and the like, and also include communication devices such as reflector-type directional antennas. The use of such instruments requires that the spacecraft be stabilized to prevent the object being examined from leaving the field of view of the instrument.

Spacecraft may be stabilized by three-axis stabilization schemes using wheels or thrusters or, when in planetary orbit, magnetic torquers to maintain a particular attitude. Another common type of stabilization is spin stabilization, in which the spacecraft spins about an axis, whereupon the spin axis tends to maintain a constant orientation in inertial parallel to the spin axis, or a despun platform may support instruments looking in other directions.

The desired spin axis of a spin-stabilized satellite is established during its design and construction. The various masses of the elements making up the spacecraft are distributed about the intended center of mass in such a fashion that under ideal conditions, spin takes place about the desired axis. Very often, however, the actual spin axis will deviate from the desired spin axis. Such deviations may occur due to thermal changes in the dimensions of various parts, which move the centers of mass of the various portions relative to the axis, or due to distributions of fuels or other fluids contained in tanks that differ from the projected distributions, or possibly due to uneven consumption of consumables such as fuel or oxidizer from various tanks placed about the space vehicle. Whatever the cause of such imbalances, they may adversely affect the pointing accuracy of instruments mounted on the space vehicle. As an extreme example, a star sensor whose field of view is directed along the desired spin axis might, in an unbalanced situation, scan a field of view in a form of an annulus about the desired star, never being able to see it.

U.S. Pat. No. 4,432,253 issued Feb. 21, 1984 to Kerlin describes compensator for dynamically balancing rotary elements by changing the mass distribution in a plurality of chambers spaced about the rotational axis. The mass is redistributed by heating the fluid in a chamber and conducting the vapor produced by heating to another chamber or chambers, where the vapor condenses, therefore transferring mass from one chamber to another chamber. This arrangement suffers from the disadvantage that, because the vapor must be condensed in a chamber, the chamber must have a temperature below the dew point of the vapor. In the context of a space vehicle, additional structure may be required to provide cooling to a chamber, and such additional structure adds weight to the spacecraft. It is generally considered to be undesirable to add weight to a spacecraft, as this reduces the amount of fuel or payload which can be carried. A further disadvantage of the Kerlin arrangement is that balance control is relatively slow, because the mass transfer rate is low.

An improved dynamic balance compensator is desired.

SUMMARY OF THE INVENTION

A method is described for balancing a spinning spacecraft which includes first and second fluid containers The method includes the steps of sensing an unbalanced condition of the spacecraft and transferring liquid from the first container to the second container in a manner which reduces the unbalance. A spacecraft adapted to carry out the method includes first and second containers for fluid and a fluid distribution arrangement coupled and to the first and second containers for enabling liquid flow between the first and second containers. A balance sensing arrangement is coupled to the spacecraft structure and is adapted for generating signals indicative of an unbalanced condition of spin. A differential pressure generating arrangement is coupled to the first and second containers and to the balance sensing arrangement, and is responsive to the signals produced by the balance sensing arrangement for generating a pressure differential between the first and second containers, which causes fluid to flow through the fluid distribution arrangement in a manner tending to reduce the unbalanced condition. In a particular embodiment of the invention, the fluid is fuel, which is redistributed through a fuel distribution manifold.

DESCRIPTION OF THE INVENTION

Figure 1:
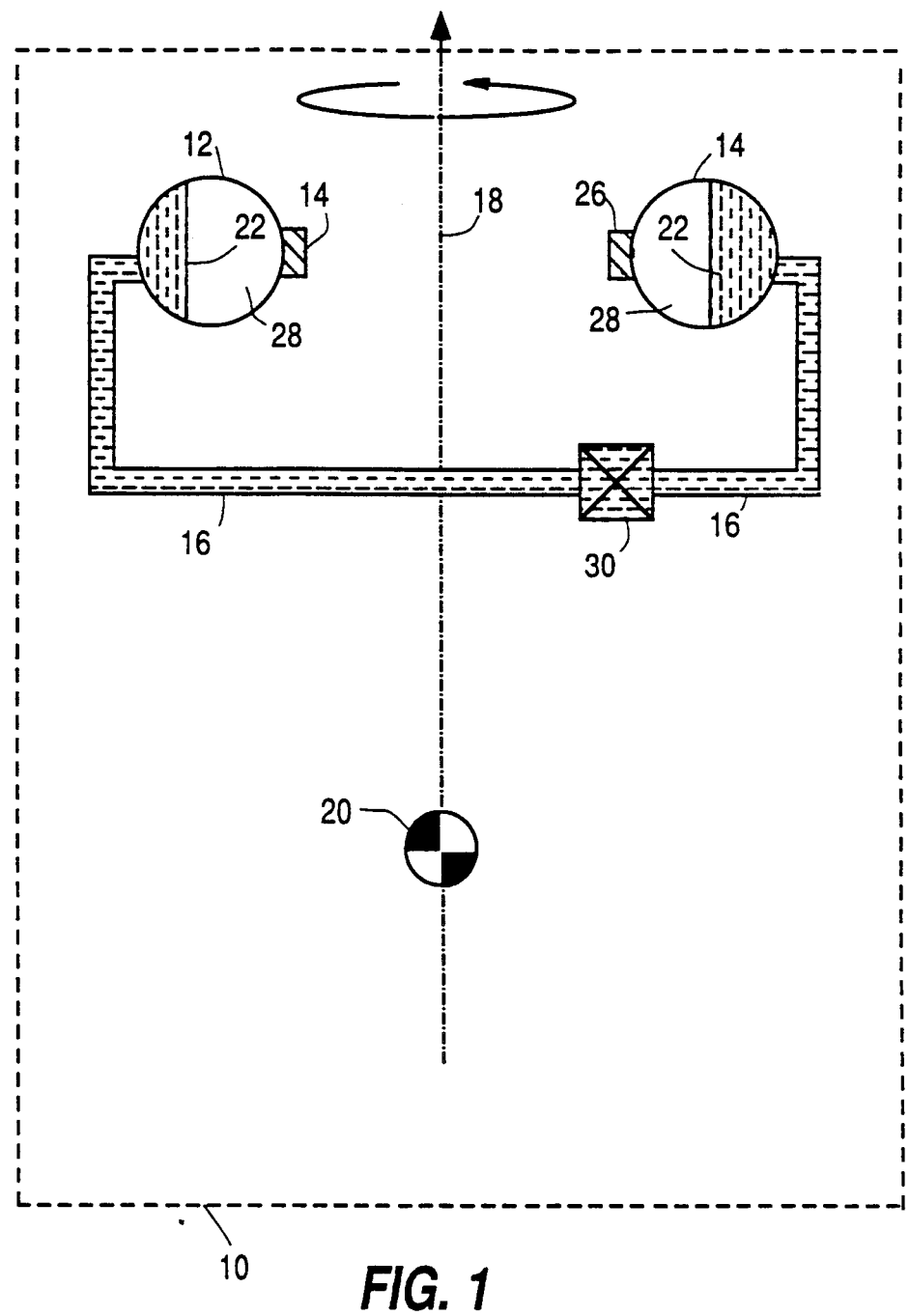
FIG. 1 illustrates in simplified schematic form a spacecraft in accordance with the invention which is adapted for balance by liquid transfer between containers.

FIG. 1 is a schematic representation of a spin balance arrangement according to the invention. In FIG. 1, a spacecraft illustrated by a dotted outline 10 includes a first container 12 for fluid and a second container 14 that is connected to container 12 by a manifold, plenum or pipe 16. Containers 12 and 14 contain fluid. The tanks may be reservoirs of coolant fluid of the type described in U.S. patent application Ser. No. 337,774 filed Apr. 13, 1989 in the name of Dowdy. As described below in connection with FIG. 2, they may be fuel containers. As yet a further alternative, the containers may be containers of FREON or other fluid used exclusively for balance purposes.

A spin axis 18 passes through the spacecraft center of mass 20. Manifold 16 connects to containers 12 and 14 at locations such that only liquid can enter or leave a container. As illustrated in FIG. 1, the liquid state 22 of the fluid contained by containers 12 and 14 lies adjacent those portions of containers 12 and 14 that are most remote from axis 18. A heater 24 is thermally coupled to container 12 at a location that is relatively close to spin axis 18, and a further heater 26 is similarly connected to a thermally coupled portion of container 14 that is relatively near spin axis 18. Since the liquid portion of the fluid contained in containers 12 and 14 tends to be displaced away from axis of rotation 18 during rotation of the spacecraft, that portion 28 of the fluid adjacent to heaters 24 and 26 is in gaseous form. This gas 28 may be the vapor form of the liquid 27 or a separate pressurant gas (such as nitrogen or helium), or a combination of vapor and pressurant gas.

In operation, one of heaters 24 or 26 is energized to heat the gas 28 contained in one of the corresponding containers 12 or 14, to thereby heat the gas adjacent to the heater and increase its pressure. The increased pressure causes liquid to transfer from the container being heated to the container not being heated. Since the density of the liquid is much greater than that of the gas, mass is transferred relatively quickly between tanks 12 and 14 when a heater is energized, by comparison with transfer by vaporization of liquid in one tank and its condensation in another.

A valve 30 is connected at a point along manifold 16 and is operable in one of two modes, to either allow the flow of liquid through manifold 16 between containers 12 and 14 or, in a second mode, to shut off or prevent the flow of liquid. Valve 30 may be placed in the first mode at the same time that one of heaters 24 and 26 is energized, to allow the flow of liquid for balancing, and then may be set in its second mode to prevent the flow of liquid, whereby the energized heater may be deenergized to conserve energy.

Figure 2:
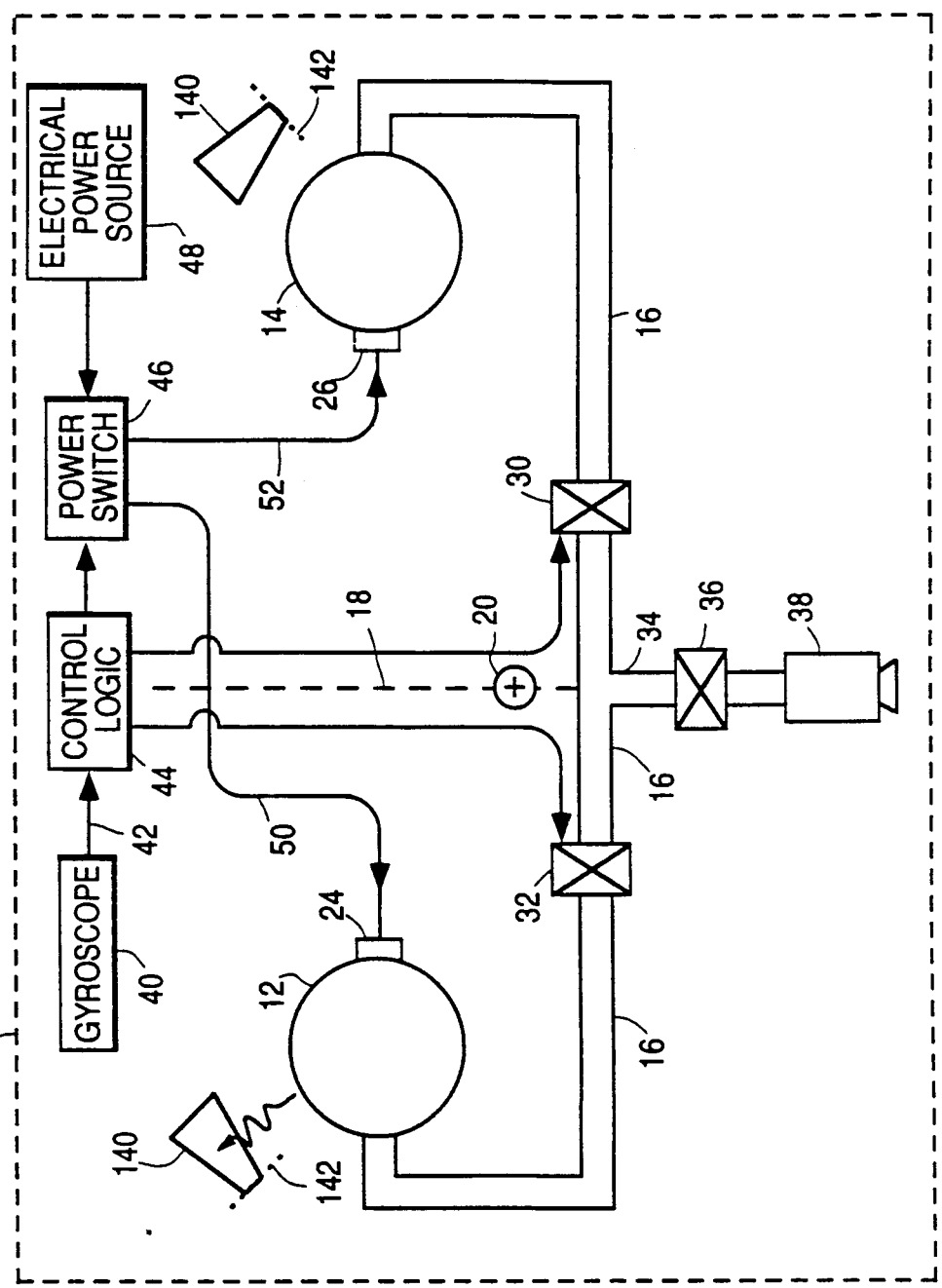
FIG. 2 is a simplified schematic diagram of a spacecraft according to an embodiment of the invention arranged for automatic spin balance control in accordance with an aspect of the inventions.

FIG. 2 is a simplified schematic diagram of another embodiment of the invention. Elements of FIG. 2 corresponding to those of FIG. 1 are designated by the same reference numerals. In FIG. 2, manifold 16 includes a further valve 32 spaced apart from valve 30 by a tee junction 34. Tee junction 34 allows communication between manifold 16 and a thruster 38 by way of a thruster control valve 36. Thruster 38 may be a monopropellant thruster utilizing a monopropellant liquid fuel which is stored in containers 12 and 14. Manifold 16 is used both for transfer of liquid fuel between containers 12 and 14 for purposes of balance, and is also used for supplying fuel to thruster 38.

A gyroscope illustrated as a block 40 is mounted to the body of spacecraft 10 and generates signals on a data path 42 for application to a control logic arrangement illustrated as a block 44. The signals produced by gyroscope 40 include information representing the direction and amount of deviation of actual spin axis 18 from the desired spin axis established by the setting of the gyroscope. Control logic circuit 44 performs standard operations upon the gyroscope signals and provides data to a power switch illustrated as block 46 for routing electrical power from a source 48, by way of one of conductors 50 or 52, to heaters 24 or 26, respectively, for heating that one of containers 12 and 14, respectively, which is to transfer fluid to the other container. If thruster 38 is not to be energized, valve 36 is closed and valves 30 and 32 are open by control logic 44, and the power control switch 46 is set to apply power to the appropriate heater, whereupon liquid is transferred between the containers 12 and 14 in a direction tending to reduce the spin imbalance.

The arrangement of FIG. 2 is particularly advantageous, because spacecraft already include plural fuel containers, thrusters, pipes, manifolds and valves, electrical power sources and fuel tank heaters, so little or no additional equipment is required except the control interconnections and control logic. Thus, the additional weight required for automatic spin balance control tends to be small in the arrangement of FIG. 2.

Figure 3:
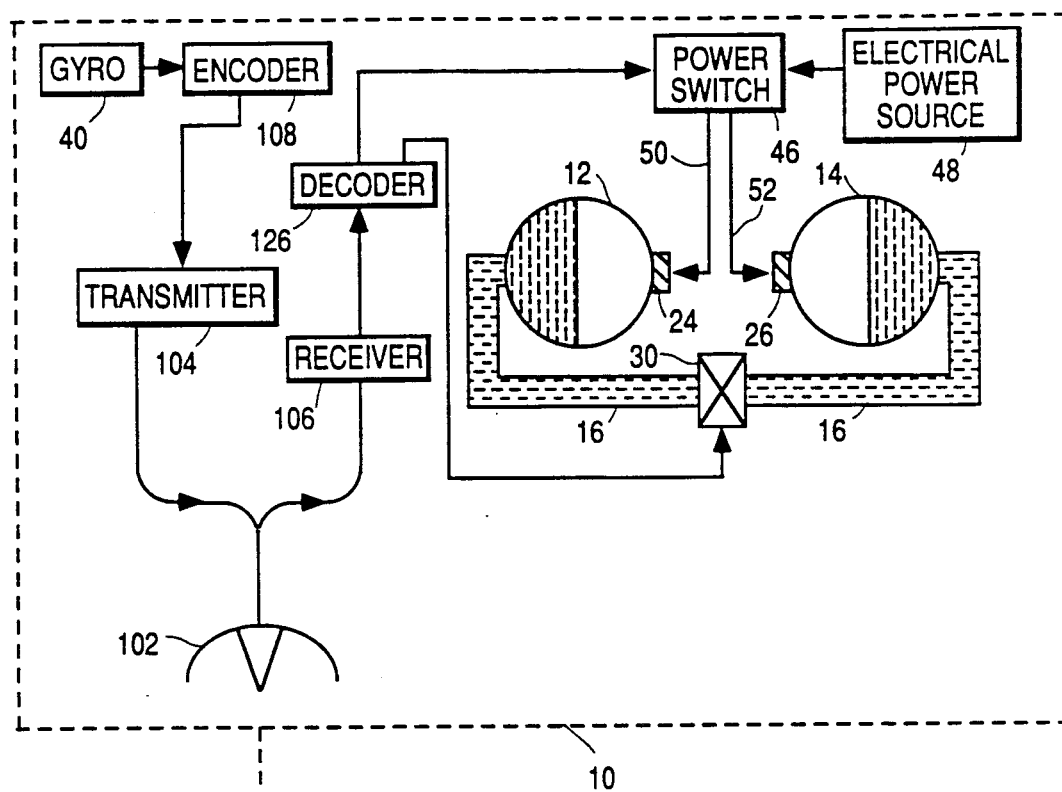
FIG. 3 is a simplified schematic diagram which illustrates a spacecraft arranged for remote control of the spin balance in accordance with another embodiment of the invention.
Figure 3:
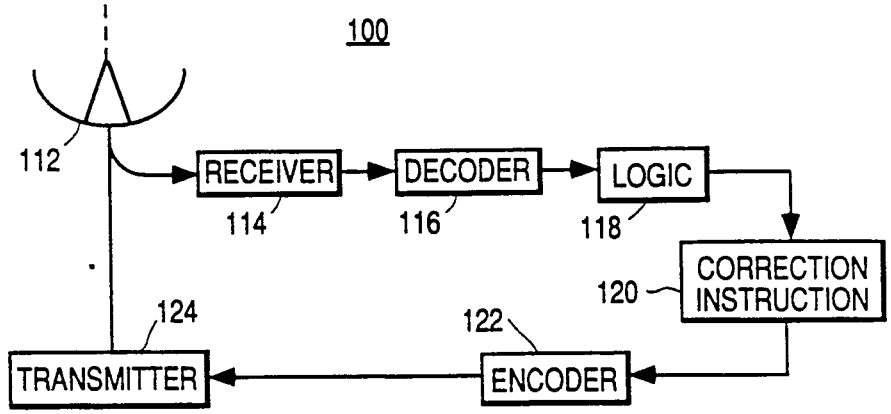

FIG. 3 is a simplified block diagram of a spacecraft adapted for remote control of a spin balance from a tracking station such as a ground station. Elements of FIG. 3 corresponding to those of FIG. 2 are designated by the same reference numerals. In FIG. 3, spacecraft 10 is viewed from a ground station designated generally as 100. An antenna 102 associated with spacecraft 10 is connected to a transmitter 104 and a receiver 106. Gyroscope 40 is connected by way of a signal encoder 108 to transmitter 104 for encoding the gyroscope signals in a manner suitable for modulation and transmission over a line-of-sight, illustrated by a dashed line 110, to a receiving antenna 112 associated with ground station 100. Ground station 100 receives transmitted signals including the modulated, encoded information from gyroscope 40, and couples it to a receiver illustrated as 114, which demodulates the signal and applies the encoded gyroscope information to a decoder 116. Decoder 116 decodes the coded gyroscope information and applies the information to a logic circuit 118, which generates signals representative of the amount of offset between the gyroscope axis and the spin axis of the spacecraft. This error information is applied from logic circuit 118 to a block illustrated as 120, which represents the implementation of a correction instruction either by means of further logic circuits, or by manual intervention. A correction instruction includes a decision as to whether sufficient electrical power is available to operate the heaters, which heater should be energized and how much, and the like. In the simple example illustrated in FIG. 3 only two fluid containers, 12 and 14, are illustrated, but in an actual situation four or more containers may be involved, and the liquid distribution might have to be changed among containers of the pairs.

The correction instructions are applied from block 120 of FIG. 3 to an encoder 122 which encodes the information in a manner suitable for modulation by a transmitter 124 and for transmission by antenna 112 back over line-of-sight path 110 to spacecraft 10. At the spacecraft, antenna 102 receives the signal and applies it to receiver 106. Receiver 106 demodulates the information and applies the encoded correction instructions to a decoder 126. Decoder 126 decodes the information, to produce signals indicative of which heater is (or heaters are) to be energized, and applies that information to power switch 46. Power switch 46 responds as described in conjunction with FIG. 2, by routing electrical power from source 48 by way of either path 50 or 52 to heaters 24 or 26, respectively, for heating that container from which liquid is to be transferred. At about the same time, decoder 126 also sends instructions to valve 30 for opening the valve to allow liquid to be transferred.

When sufficient liquid has been transferred, gyroscope 40 will indicate a reduced spin axis error or no error, and ground station 100 may decode this information and decide that sufficient correction has been accomplished At that time, block 120 of FIG. 3 produces instructions to cease the correction, which instructions are encoded in encoder 122 and modulated in transmitter 124 for transmission to spacecraft 10. In spacecraft 10, receiver 106 demodulates the modulated signals, and decoder 126 turns off power switch 46 and closes valve 30 to complete the correction operation.

While the arrangement of FIG. 3 assumes that the sensing of the unbalance occurs using information transmitted from the spacecraft, the sensing gyro aboard the spacecraft may be eliminated, and the moment-to-moment attitude of the spacecraft may be determined from Doppler shifts of the signals transmitted along line-of-sight path 110 from antenna 102 to antenna 112 if antenna 102 is displaced from the spin axis, as described generally in U.S. patent application Ser. No. 07/397,939 filed Aug. 24, 1989 in the name of Cohen. Once the attitude and errors in the spin axis are known at the ground station, instructions for correction may be transmitted to the spacecraft as described above in conjunction with FIG. 3.

Other embodiments of the invention will be apparent to those skilled in the art. For example, instead of a gyro, an appropriately located and oriented linear accelerometer could provide the necessary imbalance signal. As a further example, instead of using heaters associated with each of the containers, the containers may be exposed for radiation into space by adjustable vanes, such as vanes 140 of FIG. 2, rotatable about an axes 142, to thereby provide adjustable cooling. The movable vanes are adjusted to cool the container to which liquid is to be transferred, and not to cool the container from which liquid is to be transferred. Naturally, each container may be associated with both a heating element as described above and with cooling, if desired. Some types of spacecraft may provide cooling by means of a circulating coolant liquid and remote heat rejection panels, thereby eliminating the need to expose containers to cold space for transferring heat therefrom for cooling. Heaters such as heater 24 or 26 may be multipartite, with each part being separately controllable, so that the amount of heat transferred to each container may be varied in steps, to thereby change the temperature to which the fluid therein is raised for a given container heat loss characteristic. Alternatively, power switch 46 may be operated with a pulse-width or pulse-duration modulation to accomplish the same result. The voltage of the electrical power source may be varied as a further alternative.

What is claimed is:

1. A spacecraft adapted to be spun about an axis during operation, comprising:
    propellant utilization means;
    first and second containers for fluid propellant;
    propellant distribution means coupled to said propellant utilization means and to said first and second containers for enabling liquid propellant flow among said propellant utilization means, said first container and said second container;
    balance sensing means adapted for generating signals indicative of an unbalanced condition of said spin; and
    differential pressure generating means coupled to said first and second containers and to said balance sensing means, and responsive to said signals for generating a pressure differential between said first and second containers, for thereby causing liquid fluid propellant to flow through said propellant distribution means in a manner tending to reduce said unbalanced condition, said differential pressure generating means comprising means for creating a temperature differential between at least portions of said first and second containers.

2. A spacecraft according to claim 1, wherein said propellant utilization means comprises a thruster.

3. A spacecraft according to claim 2, wherein said thruster is a monopropellant thruster.

4. A spacecraft according to claim 1, wherein at least a portion of said fluid in each of said first and second containers is a liquid.

5. A spacecraft according to claim 1, wherein at least a portion of said fluid in each of said first and second containers is a gas.

6. A spacecraft according to claim 1, wherein said balance sensing means comprises a gyroscopic means.

7. A spacecraft according to claim 1, wherein said means for creating a temperature differential comprises heating means coupled to at least one of said first and second containers.

8. A spacecraft according to claim 1, wherein said means for creating a temperature differential comprises cooling means coupled to at least one of said first and second containers.

9. A spacecraft according to claim 8, wherein said cooling means comprises means for radiating heat into space.

10. A spacecraft according to claim 7, wherein said heating means is coupled to a portion of said one of said first and second containers which, when said spacecraft is spinning in operation, is adjacent to a gaseous portion of said fluid fuel.

11. A spacecraft according to claim 1, further comprising gating means coupled to said fuel distribution means for, in a first condition, permitting fluid to flow between said first and second containers and for, in a second condition, preventing fluid flow between said first and second containers.

12. A method for balancing a spinning spacecraft, which spacecraft includes thruster means and also includes plural fluid propellant containers interconnected with said thruster means by a manifold, said manifold being interconnected with each of said containers at a location remote from the spacecraft spin axes so that the manifold is coupled for transfer of a liquid component of said fluid propellant,
    said method comprising the steps of:
    sensing an unbalanced condition of said satellite;
    generating a temperature difference between at least a portion of said fluid propellant in two of said containers, for thereby generating a differential pressure;
    in response to said differential pressure, moving a portion of said liquid portion of said propellant from one of said containers to another of said containers in a manner selected to reduce said imbalance.

* * * * *